July 12, 1949.  H. J. MERTZ  2,476,058
BRAKE CONTROL AND ACCELERATOR ASSEMBLY
Filed Aug. 30, 1945  4 Sheets-Sheet 1

Inventor
HARRY J. MERTZ
By Carlsen & Hazle
Attorneys

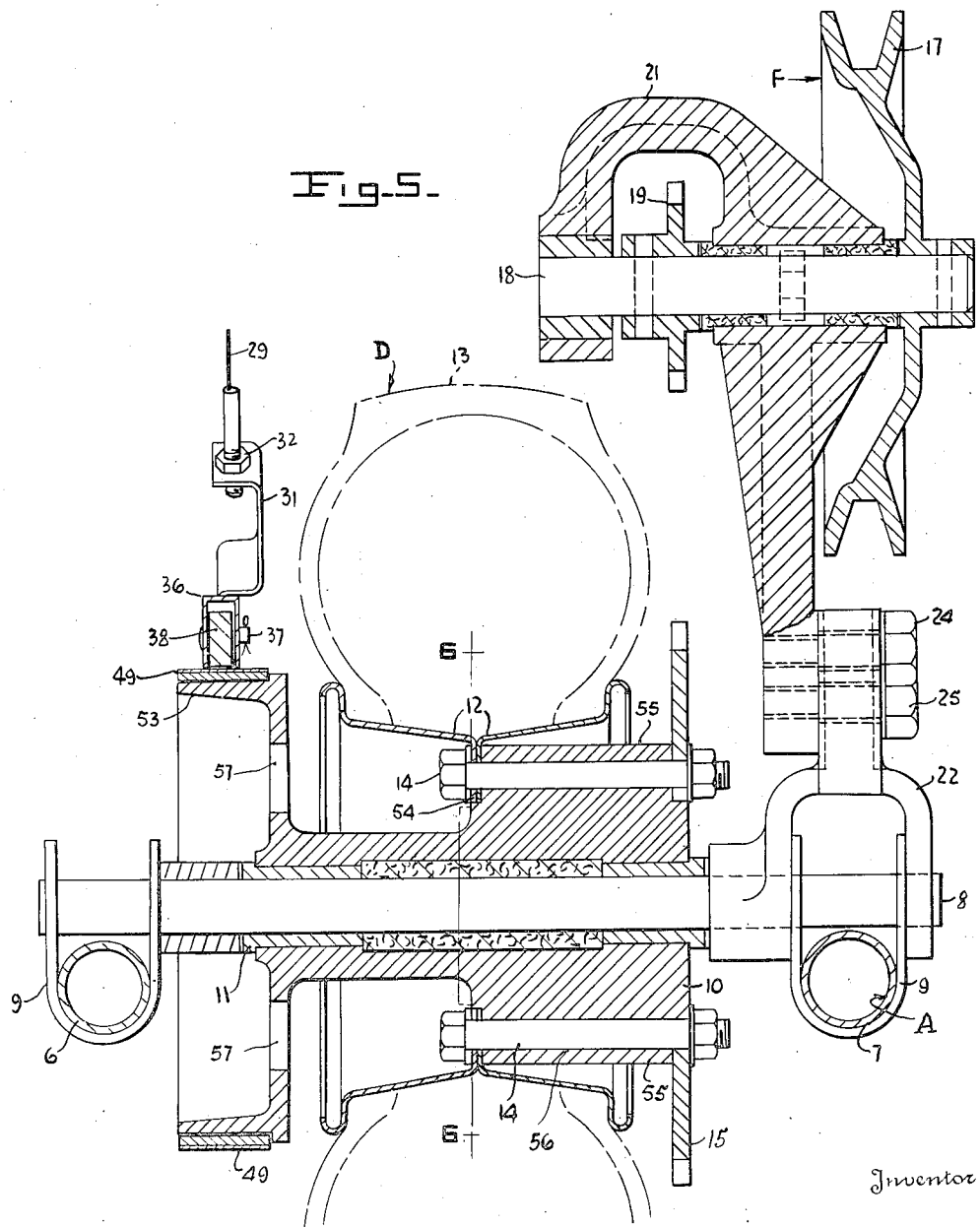

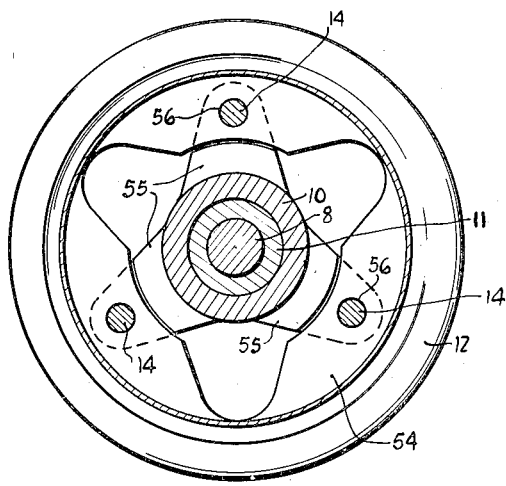
Fig-6-
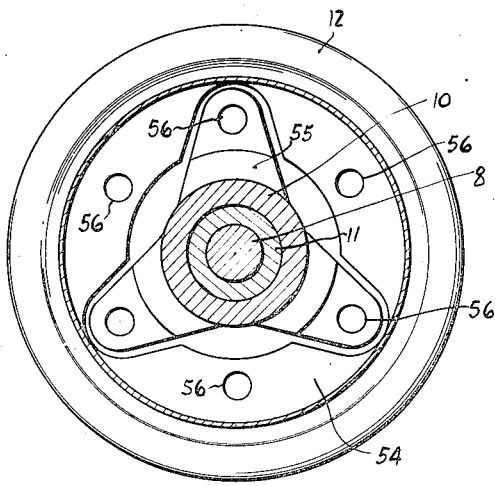
Fig-7

Patented July 12, 1949

2,476,058

UNITED STATES PATENT OFFICE 2,476,058

BRAKE CONTROL AND ACCELERATOR ASSEMBLY

Harry J. Mertz, Webster City, Iowa, assignor to Solar Corporation, Milwaukee, Wis., a corporation of Delaware Application August 30, 1945, Serial No. 613,640

2 Claims. (Cl. 192—3)

This invention relates to vehicles of the two or three wheel type, more commonly referred to as "scooters," and the primary object is to provide an improved, simple and rugged mechanism for controlling the operation of the vehicle, and which includes a novel brake control and accelerator assembly operationally associated with a unitary wheel hub and brake structure. More particularly the present invention is an improvement over the structure disclosed and claimed in the Patent No. 2,445,058 issued to George C. Fields, for Motor vehicle. Further and more detailed objects will be referred to in the course of the following specification, reference being had to the accompanying drawings, in which—

Fig. 5 is an enlarged sectional view as seen substantially on the irregular line 5—5 in Fig. 4.

Figure 1:
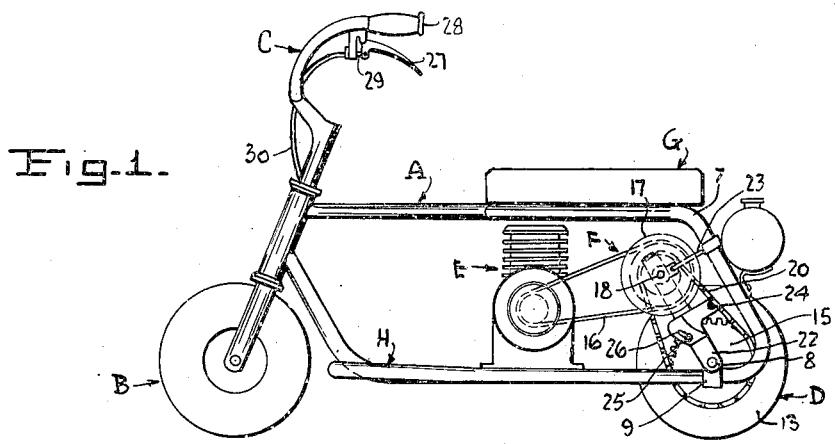
Fig. 1 is a side elevation of a scooter embodying my invention, as seen from the left.
Figure 2:
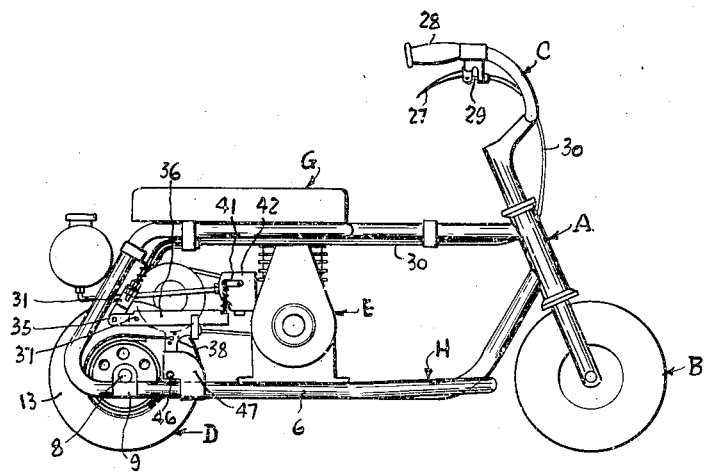
Fig. 2 is an elevation of the vehicle shown in Fig. 1, but as seen from the right hand side.

Fig. 6 is a sectional elevation on the line 6—6 in Fig. 5, showing the tire rims 12 as bolted in place on the hub 10.

Fig. 7 is a sectional elevation similar to Fig. 6, but showing the rim bolts removed and with the rim members turned to a position where they may be removed from the hub.

Referring to the drawings more particularly and by reference characters, A designates the frame of a scooter vehicle, the same being supported on front wheel B steered by handle bars C, and by rear wheel D driven by engine E through suitable transmission mechanism F. The driver normally operates the machine sitting on seat G and with his feet resting on foot support H.

The frame A, preferably formed of tubular metal or pipe, is comparatively narrow at its forward portion, so as to best accommodate the driver, but the rear end is bifurcated and includes two rigidly connected frame bars 6—7 disposed in vertical parallel planes, and the upper parts of which support the seat G, while the lower parts support the motor or engine E.

The rear wheel D, is disposed between lower rear end portions of the bars 6—7, and is mounted on an axle 8 that is secured as by U-shaped clips 9.

The hub of the wheel D (see Fig. 5) comprises a cast member 10, having bushings 11 surrounding the axle 8, and a pair of flanged collar or rim sections 12 which are so formed as to properly receive and support the tire 13. The members 12 are rigidly secured to the hub member 10 by bolts 14 which also serve to secure a sprocket gear 15 by which the wheel is rotated.

The transmission mechanism F includes a belt 16 connecting a pulley on the motor with a larger pulley 17 mounted rearwardly thereof on a shaft 18 which also carries a sprocket pinion 19 that drives a chain 20 passing about sprocket gear 15 to complete the drive connection.

The shaft 18 is journaled in the upper section 21 of a bracket 21—22 that fulcrums on the shaft 8, whereby the position of the pulley 17 may be adjusted to regulate the tension of belt 16. Such adjustment may be effected through an adjustable connection 23 with an upper part of frame bar 7 (Fig. 1). The two bracket sections 21 and 22 are pivotally connected at 24 and are adjustably secured with respect to each other by a bolt 25 secured in one section and operating in an arcuate slot 26 of the other section for the purpose of properly tensioning the drive chain 20.

Although not here disclosed it may be noted that the transmission mechanism preferably includes a fluid drive coupling, the same being mounted on the engine shaft for operating the pulley that drives the belt 16, as shown for instance in the aforesaid Fields application, Serial No. 514,043.

In that type of drive it is unnecessary to entirely disengage the drive wheel D from the engine when stopping the vehicle, and consequently if the engine is decelerated and the rear wheel braked the vehicle may be stopped while still permitting the engine to run at idling speed. It has therefore been to considerable advantage to incorporate both the brake control and the carburetor or engine adjustment in the same control mechanism and in such manner that both may be actuated simultaneously by a single control member.

In the present instance the control member is a finger lever 27 and it is mounted adjacent one of the handles 28 of the handle bar C, in such manner that when it is squeezed toward the handle it will exert a pull on a flexible cable 29. This cable extends through a flexible conduit 30 to the rear of the machine where it attaches to a link 31, an adjustment 32 being provided between the cable and link. A spring 33, acting against a fixed bracket 34, tends to urge the link 31, downward, and, of course, the pull on cable 29 is against the tension of this spring.

The lower end of link 31 is pivoted, at 35, to one end of a straight lever 36, fulcrumed at 37, to one end of a generally T-shaped lever 38. The lever 36 is channeled, or U-shaped in cross-section (Fig. 5) to straddle the head end of lever 38, and, at the end opposite from fulcrum 37, is provided with a clip or strap 39 which engages under the corresponding end of lever 38. Strap 39 is of such length as to permit considerable tilting action of lever 36 with respect to lever 38.

Figure 3:
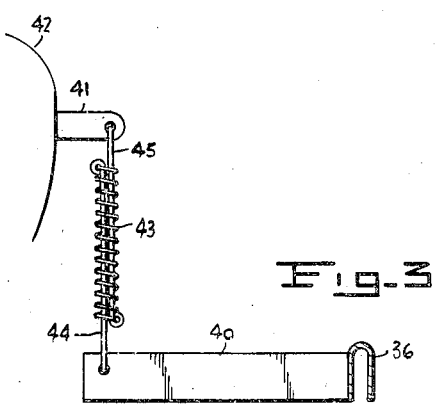
Fig. 3 is a detail elevation of a carburetor adjusting element, as seen on line 3—3 in Fig. 4.

At its forward extremity the lever 36 has an inward extension 40 (Fig. 3) connected by a push and pull spring device for operating the gas control lever 41 of the engine carburetor 42. This device comprises a single spring 43 through which extends two wires or rods 44 and 45. Rod 44 attaches at its lower end to lever 36 and at its upper end to the upper end of the spring, while rod 45 is connected to the lower end of the spring 43 and to the carburetor valve lever 41. The parts are so arranged that when the carburetor is completely open the spring 43 will be under compression, and when the carburetor lever is in engine idling position the spring will be under tension. The lever 36, which may also be designated as an accelerator arm, has a tilting movement or stroke somewhat greater than that required to open and close the carburetor.

Referring again to the T-lever 38, it is fulcrumed at point 46 in a bracket 47 rigidly secured on frame bar 6 and the rearward movement of this lever is limited by a lug 48 of the bracket. A brake band 49 is secured, at its opposite ends, to the brake lever 38, as at points 50 and 51, the connection 51 being adjustable, as at 52, to provide for wear adjustment of the brake lining. The brake drum 53, as best shown in Fig. 5, is an integrally cast extension of the wheel hub 10.

It is here to be noted that since the securing flanges 54 of the rim sections 12 are bolted, by 14, to the inner side of the hub 10 proper, and cannot be removed leftwardly, as seen in Fig. 5, because of the integral gear section 53, provision must be made for their quick and convenient removal, and this is done as best illustrated in Figs. 6 and 7.

Figure 4:
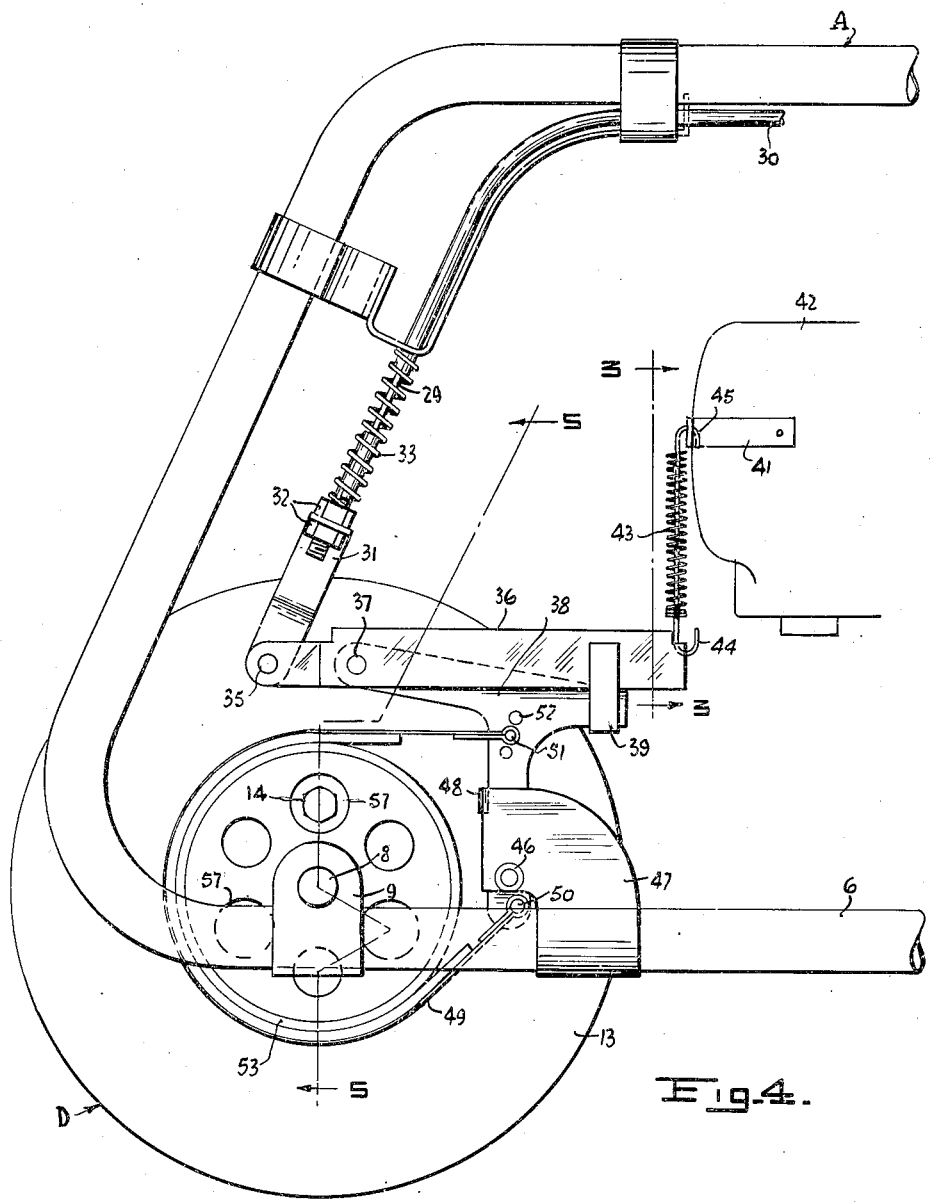
Fig. 4 is an enlarged detail elevation of the rear end of the machine, as seen in Fig. 2, and with some parts omitted for purpose of clarity.

To this end the hub 10 is generally star-shaped in cross section, having radially and longitudinally extending lugs 55 which are bored at 56, to receive the bolts 14. Likewise, the rim flanges 54 are similarly sectioned, each corresponding section being bored, as at 56, to receive the bolts 14. The inner contour of the flange sections is such as to leave a star-shaped contour of the adjacent hub section. It will thus be seen that when the tire rim and hub are in the relative positions shown in Fig. 6 the bolts 14 can be inserted to rigidly secure the parts together. But when the rim is to be removed, as for instance to repair a tire, the operation is very simple. Thus removal of the bolts 14 releases both the gear 15 and the rim 12, whereupon it is a simple matter to rotate the rim with respect to the hub sufficiently so that the star-shaped opening will register with the hub lugs 55, as shown in Fig. 7, so that the rim can now be moved axially or to the right as viewed in Fig. 5. To facilitate removal and attachment of the bolts 14 wrench holes 57 are provided in the attaching web of the brake drum, as in Figs. 4 and 5.

While the operation of the device will no doubt be understood from the foregoing, the following additional explanation appears in order.

When the motor is to be started the finger lever 27 is first clamped tightly up against the handle 28, and may there be locked by some suitable latch (not shown) if so desired. This movement of the finger lever is not only sufficient to shut down the carburetor to engine idling speed, but also lifts the rear end of brake lever 38, to a point that it will tightly brake the wheel D, such action being permitted by stretching of the spring 43. To start the vehicle it is then only necessary to gradually release the finger lever whereupon the spring 33 expands against the link 31 to lower the rear end of arm 36. The initial movement thus produced first releases the brake, after which the forward end of arm 36 rises to stretch the spring 43 until the arm 41 is raised to thereby open the carburetor valve to such an extent as may be necessary. When the finger lever 27 is completely released the arm 41 is at its maximum height and the engine is operating at full speed.

It will be understood that various modifications may be made in the design and structural details of the invention as herein disclosed without departing from the spirit and scope of the appended claims. Having now therefore fully illustrated and described this invention what is claimed is:

1. In a motor vehicle control apparatus the combination with a carburetor control arm and brake, of a substantially T-shaped brake lever fulcrumed on the vehicle and connected with the brake to operate the same, said brake lever having generally horizontal arms forming the cross head of the T, a carburetor control lever extending lengthwise of the horizontal arms of of the brake lever and pivoted on one of said arms and having a stop limiting movement of the carburetor lever with respect to the other arm, the carburetor control lever being channel shaped in coss section to receive the entire length of the horizontal arms of the brake lever.

2. In a vehicle having a frame, a wheel journaled to the frame and having a brake drum, an engine with a carburetor for driving the wheel mounted on the frame, a bracket secured to the frame adjacent the wheel, a generally T-shaped brake lever fulcrumed to the bracket intermediate its upper and lower ends, a brake band encircling the drum and having its ends attached to the brake lever at points spaced above and below the brake lever fulcrum, a carburetor control lever extending lengthwise along the upper bar of the brake lever and pivoted to one end thereof, the other end of the carburetor control lever having freedom for limited swinging movement with respect to the other end of the upper bar of the brake lever, and means connected to the fulcrumed end of the carburetor control lever for actuating the same and for actuating the brake lever, the other end of said control lever being connected to the carburetor.

HARRY J. MERTZ.

REFERENCES CITED

The following references are of record in the file of this patent:

UNITED STATES PATENTS

| Number | Name | Date |
|---|---|---|
| 1,297,676 | Gibson | Mar. 18, 1919 |
| 1,434,013 | Kettering | Oct. 31, 1922 |
| 1,461,869 | Franzenburg | July 17, 1923 |
| 1,630,199 | Megnin | May 24, 1927 |
| 1,817,416 | Lippert | Aug. 4, 1931 |
| 1,928,915 | Stout | Oct. 3, 1933 |
| 1,942,181 | Maurer | Jan. 2, 1934 |
| 2,015,717 | Hanratty | Oct. 1, 1935 |
| 2,151,893 | Brauer | Mar. 28, 1939 |
| 2,258,778 | Lewis | Oct. 14, 1941 |
| 2,279,874 | Rockola | Apr. 14, 1942 |
| 2,321,614 | Palmer | June 15, 1943 |
| 2,387,076 | Johnson | Oct. 16, 1945 |
| 2,445,058 | Fields | July 13, 1948 |